(12) United States Patent
Vrane et al.

(10) Patent No.: US 10,739,245 B2
(45) Date of Patent: Aug. 11, 2020

(54) COMPACT MULTI-COLOR FLOW CYTOMETER

(71) Applicant: CYTEK BIOSCIENCES, INC., Fremont, CA (US)

(72) Inventors: David Vrane, San Jose, CA (US); Ming Yan, Pleasanton, CA (US); Eric Chase, Walnut Creek, CA (US); Wenbin Jiang, Danville, CA (US)

(73) Assignee: Cytek Biosciences, Inc., Fremont, CA (US)

( * ) Notice: Subject to any disclaimer, the term of this patent is extended or adjusted under 35 U.S.C. 154(b) by 409 days.

(21) Appl. No.: 15/498,397

(22) Filed: Apr. 26, 2017

(65) Prior Publication Data

US 2017/0307505 A1    Oct. 26, 2017

Related U.S. Application Data

(60) Provisional application No. 62/327,946, filed on Apr. 26, 2016.

(51) Int. Cl.
*G01N 15/14* (2006.01)
*G01N 21/64* (2006.01)
(Continued)

(52) U.S. Cl.
CPC ..... *G01N 15/1436* (2013.01); *G01N 21/6486* (2013.01); *G01N 2015/0065* (2013.01);
(Continued)

(58) Field of Classification Search
None
See application file for complete search history.

(56) References Cited

U.S. PATENT DOCUMENTS

| 6,097,485 A | 8/2000 | Lievan |
| 6,366,354 B1 | 4/2002 | Chandler |

(Continued)

FOREIGN PATENT DOCUMENTS

| EP | 1-986044 | 10/2008 |
| WO | WO 2012/055432 | 5/2012 |

(Continued)

OTHER PUBLICATIONS

Thomas, Shane; International App. No. PCT/US2017/029724; International Search Report/Written Opinion; dated Sep. 6, 2017; 16 pages.

*Primary Examiner* — Jill A Warden
*Assistant Examiner* — Brittany I Fisher
(74) *Attorney, Agent, or Firm* — Alford Law Group, Inc.; William E. Alford

(57) ABSTRACT

A system, an apparatus, and a method are provided for a modular flow cytometer with a compact size. In one embodiment, the modular flow cytometry system includes the following: a laser system for emitting laser beams; a flow cell assembly positioned to receive the laser beams at an interrogation region of a fluidics stream where fluoresced cells scatter the laser beams into fluorescent light; a fiber assembly positioned to collect the fluorescent light; and a grating system including a dispersive element and a receiver assembly, wherein the dispersive element is positioned to receive the fluorescent light from the fiber assembly and to direct spectrally dispersed light toward the receiver assembly.

26 Claims, 6 Drawing Sheets

(51) Int. Cl.
  *G01N 15/10* (2006.01)
  *G01N 15/00* (2006.01)
(52) U.S. Cl.
  CPC ........... *G01N 2015/1006* (2013.01); *G01N 2021/6421* (2013.01); *G01N 2201/068* (2013.01); *G01N 2201/0612* (2013.01); *G01N 2201/08* (2013.01)

(56) References Cited

U.S. PATENT DOCUMENTS

| | | | |
|---|---|---|---|
| 6,510,007 B1 | 1/2003 | Blasenheim | |
| 7,440,101 B2 | 10/2008 | Auer et al. | |
| 7,709,821 B2 | 5/2010 | Casstevens et al. | |
| 8,054,468 B2 * | 11/2011 | de Boer | A61B 5/0059 356/456 |
| 8,175,685 B2 * | 5/2012 | Yun | A61B 3/102 356/479 |
| 8,454,813 B2 | 6/2013 | Voldman et al. | |
| 2003/0205682 A1 * | 11/2003 | Kapoor | G01J 3/433 250/458.1 |

FOREIGN PATENT DOCUMENTS

| | | |
|---|---|---|
| WO | WO 2014/205007 | 12/2014 |
| WO | WO 2016/057923 | 4/2016 |

\* cited by examiner

COMPACT MULTI-COLOR FLOW CYTOMETER

CROSS REFERENCE TO RELATED APPLICATION

This patent application claims the benefit of U.S. Provisional Patent Application No. 62/327,946 titled COMPACT MULTI-COLOR FLOW CYTOMETER filed on Apr. 26, 2016 by inventors Wenbin Jiang et al., incorporated herein by reference for all intents and purposes.

FIELD

The embodiments of the invention relate generally to flow cytometers.

BACKGROUND

A flow cytometer is a biological cell (bio-cell) analysis and counting instrument. It is used to analyze the physical and chemical characteristics of bio-cells in a fluid as they pass through one or more laser beams from lasers. The bio-cells are fluorescently labeled and then excited by the lasers to emit light at correspondent wavelengths. The fluorescence and the scattered light can be detected and measured to determine various properties of the cells. Up to thousands of cells per second can be analyzed by a flow cytometer.

Generally, a flow cytometer includes components of fluidics, optics and electronics. The fluidics system is to line up and transport cells in a stream of fluid to the laser beams where they are excited. Any cell of submicron to over 100-µm in size can be analyzed. The optics system consists of lasers which excite the cells in the stream and get scattered. Fluorescent labeled cells emit fluorescence, which is collected by a lens. The laser light scattered by the cells is captured at forward and side directions. Optical steering mirrors direct the light signals to the correspondent detectors, such as a photomultiplier tube (PMT), an avalanche photodiode (APD) or a PIN diode (diode with a wide, undoped intrinsic semiconductor region between a p-type semiconductor and an n-type semiconductor region). An electronics system converts the light signals detected into electronic signals for a computer to process. Data are collected on each cell. The characteristics of the cells are determined based on their fluorescent and light scattering properties. A large number of cells are analyzed to draw information on the heterogeneity and different subsets within the cell populations. The data are usually presented in the form of single parameter histograms or as plots of correlated parameters, which are referred to as cytograms, displaying data in the form of a dot plot, a contour plot, or a density plot.

Flow cytometry has been widely used in the diagnosis of leukemia and human immunodeficiency virus (HIV). Flow cytometry is also commonly used in basic research and clinical trials, such as molecular biology, immunology, and pathology. Flow cytometry has become an important lab process in transplantation, oncology, hematology, genetics and prenatal diagnosis. Flow cytometry can also be used to help identify cell surface protein variants.

Conventional flow cytometers are large in size due to their complicated system construction. Bench top space is always precious in a lab, especially when many diagnostic instruments compete for presence in the lab and the many tests that must be accommodated to service the various clients and patients. In a single core lab, there are normally many flow cytometers deployed for service where the size of the flow cytometer becomes of greater concern.

BRIEF SUMMARY

The embodiments of the invention are summarized by the claims that follow below.

BRIEF DESCRIPTIONS OF THE DRAWINGS

DETAILED DESCRIPTION

In the following detailed description of the embodiments of the invention, numerous specific details are set forth in order to provide a thorough understanding. However, it will be obvious to one skilled in the art that the embodiments of the invention can be practiced without these specific details. In other instances well known methods, procedures, components, and circuits have not been described in detail so as not to unnecessarily obscure aspects of the embodiments of the invention.

The embodiments of the invention include a method, apparatus and system for a modular flow cytometer (modular flow cytometry system) with a compact size.

In conventional systems, there have been efforts on reducing the size of a flow cytometer. However, so far, the success has been limited to those flow cytometers that can handle cells labeled with a limited amount of fluorescence colors or dyes (e.g., up to twelve fluorescence colors). Such systems have limited applications in core labs where a flow cytometer is desired to have up to twenty colors in order to accommodate a variety of customer demands; while keeping a common system configuration to increase the operation efficiency; and reduce the management and maintenance costs.

Accordingly, a purpose of the invention is to provide a flow cytometer that is compact in size while having the capability to process cells of fluoresces labeled up to fifty (50) colors. A compact flow cytometer is thereby more portable, easier to manage, lower cost to maintain and more user friendly in core labs and many hospitals and clinics. Another purpose of the invention to provide an instrument that is more reliable and more energy efficient with lower electromagnetic emission (and thereby lower electromagnetic interference (EMI)) due to the adoption of more energy efficient and lower power consuming optoelectronics and electronics components with better shielding. A reliable instrument is important for applications in a medical emergency environment, while a low EMI instrument is critical in a clinical application environment in order to reduce interferences to other life-saving instrumentation.

The compact size of the modular flow cytometry system is obtained by taking a system level approach to size reduction. Accordingly, the modular flow cytometry system may also be referred to as a compact flow cytometer or a compact modular flow cytometer. By virtue of modular design, advantageous use of subsystem synergies, and innovative use of contemporary technology, the modular flow cytometry system achieves a small package size without compromising performance or serviceability.

Figure 1:
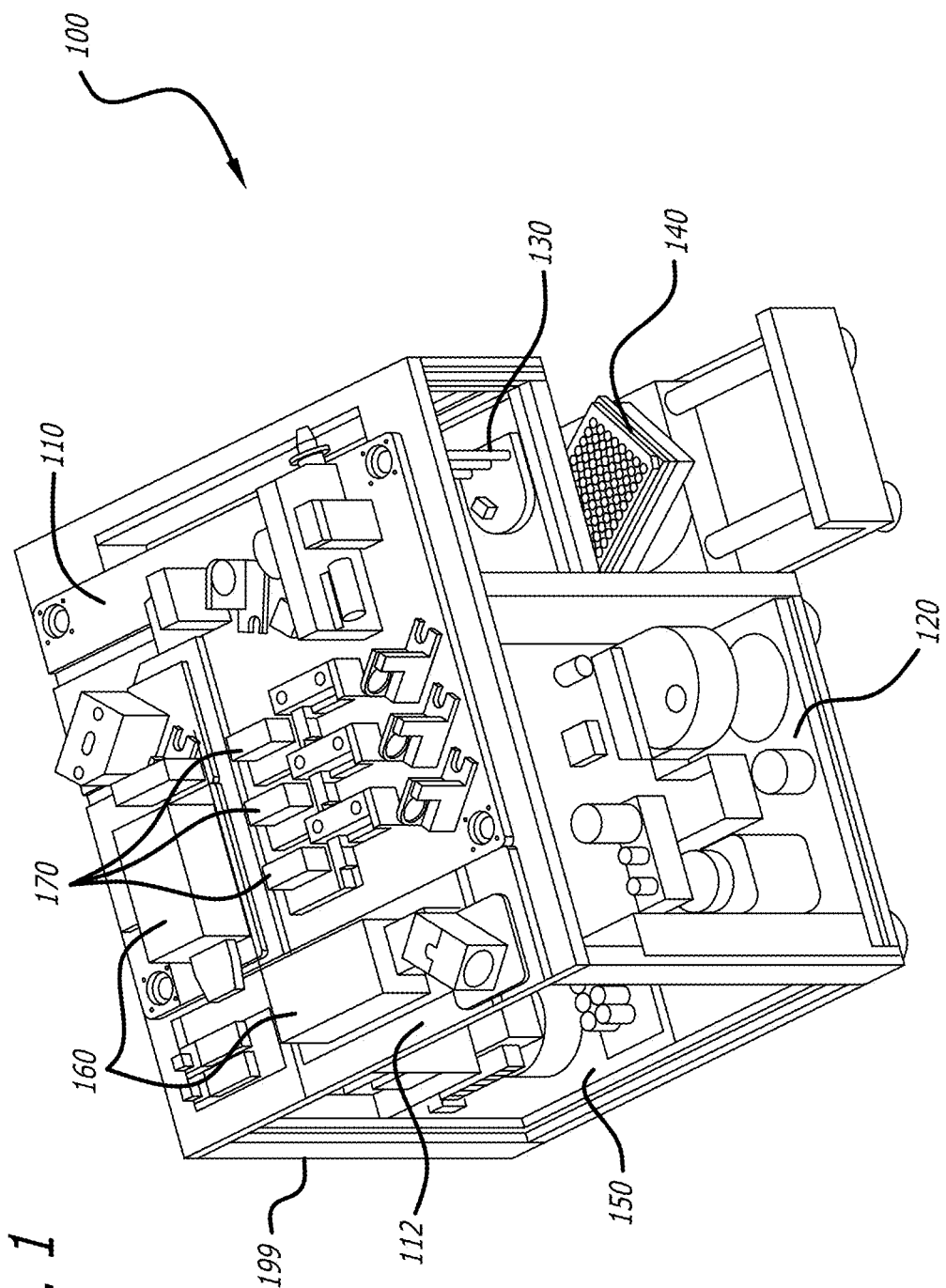
FIG. 1 is a perspective view showing the left, front, and top sides of a modular flow cytometry system.

FIG. 1 is a perspective view showing the left, front, and top sides of a modular flow cytometry system 100. The modular flow cytometry system 100 includes a modular enclosure 199 with an optical plate assembly 110 mounted on top of the modular enclosure 199. The system 100 further includes a sample injection tube (SIT) assembly 130, a loader assembly 140, an electrical panel assembly 150 including power supplies, and a fluidics assembly 120 mounted to or mounted within the modular enclosure 199. The system 100 still further includes grating assemblies 160, a laser system 170 having laser emitters, and a flow cell assembly 308.

Figure 2:
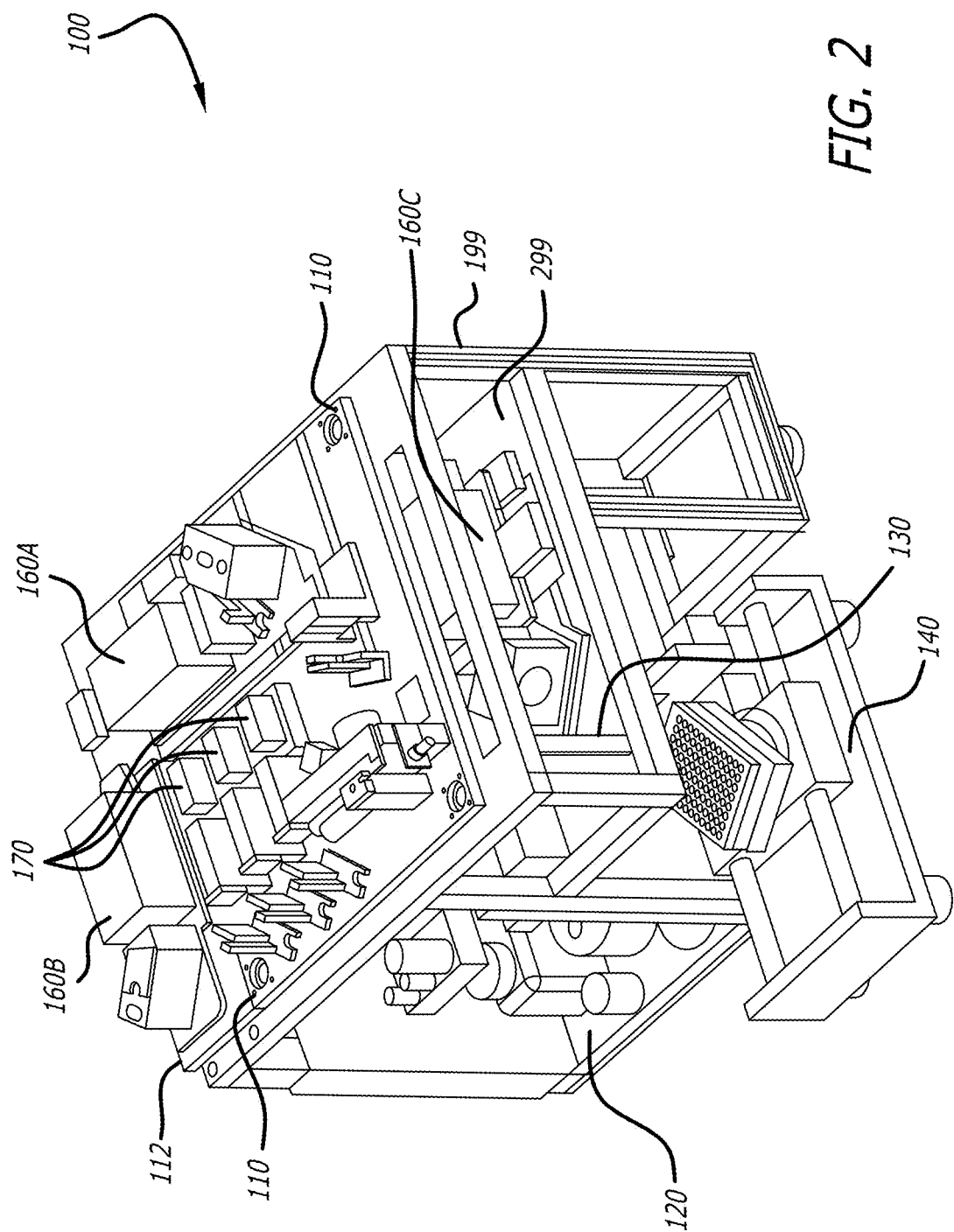
FIG. 2 is a perspective view showing the front, right, and top sides of the modular flow cytometry system.

FIG. 2 is a perspective view showing the front, right, and top sides of the modular flow cytometry system 100. The view in FIG. 2 further illustrates the SIT assembly 130, the loader assembly 140, and the grating assemblies 160, including a third grating assembly on a lower shelf/level 299 of the modular enclosure 199. All three grating assemblies 160 can correspond to all three lasers of the laser system 170; alternatively, each of the grating assemblies can correspond to a different one of the lasers of the laser system 170. Another embodiment can include another number (e.g., three or four) of grating assemblies 160, depending on the number of lasers in the laser system 170 used or depending on some other configuration of the cytometry system 100.

Figure 3:
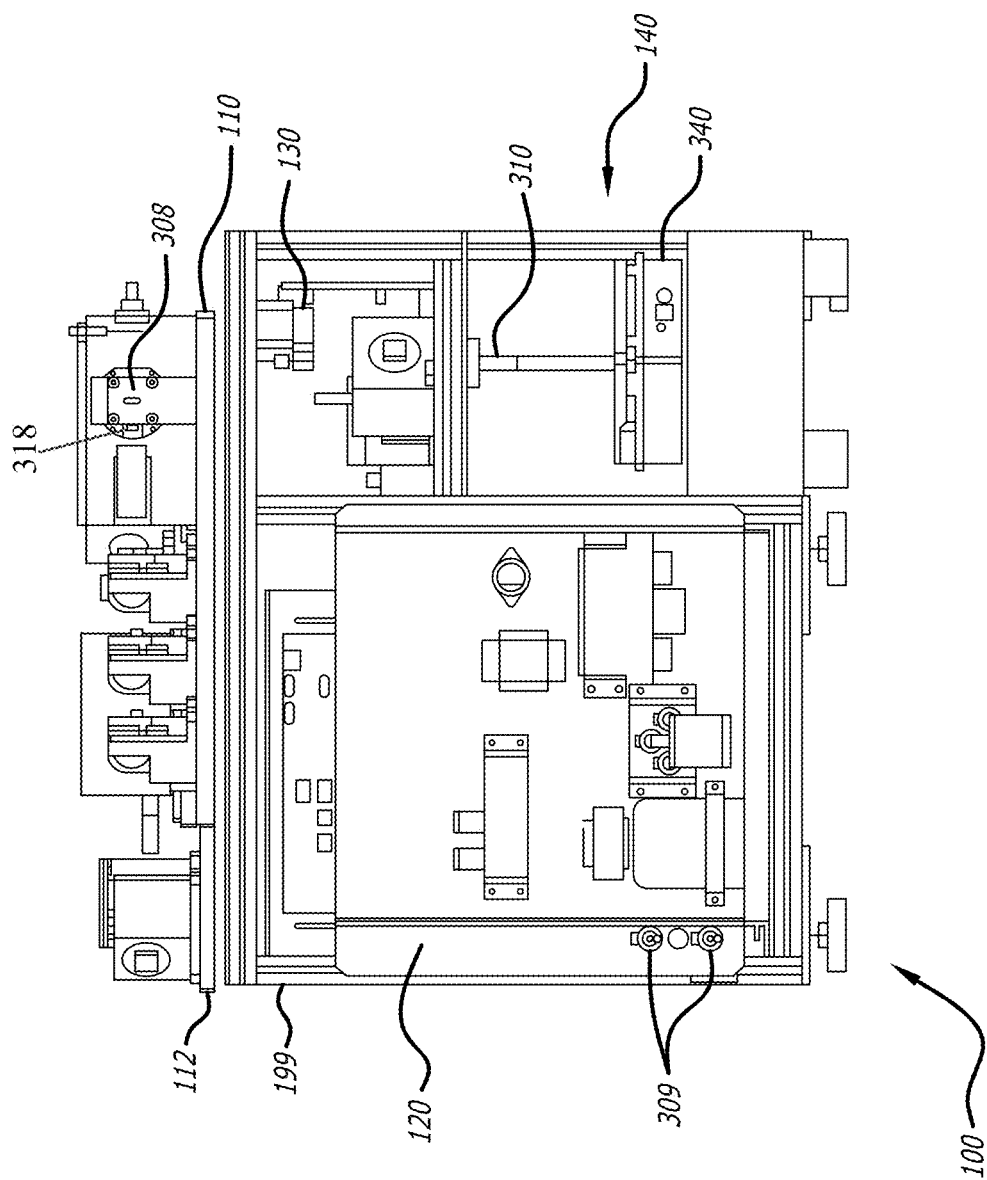
FIG. 3 shows a front-side view of the modular flow cytometry system.

FIG. 3 shows a front-side view of the modular flow cytometry system 100. The modular flow cytometry system 100 has dimensions of a width of 520 mm, a height of 530 mm, and a depth of about 500 mm without loader or a depth of about 640 mm if including the loader. This size allows a typical lab bench that is 72 inch (1829 mm) long and 24 inch (610 mm) deep to accommodate three modular cytometer systems 100 comfortably side-by-side on the lab bench.

Figure 5:
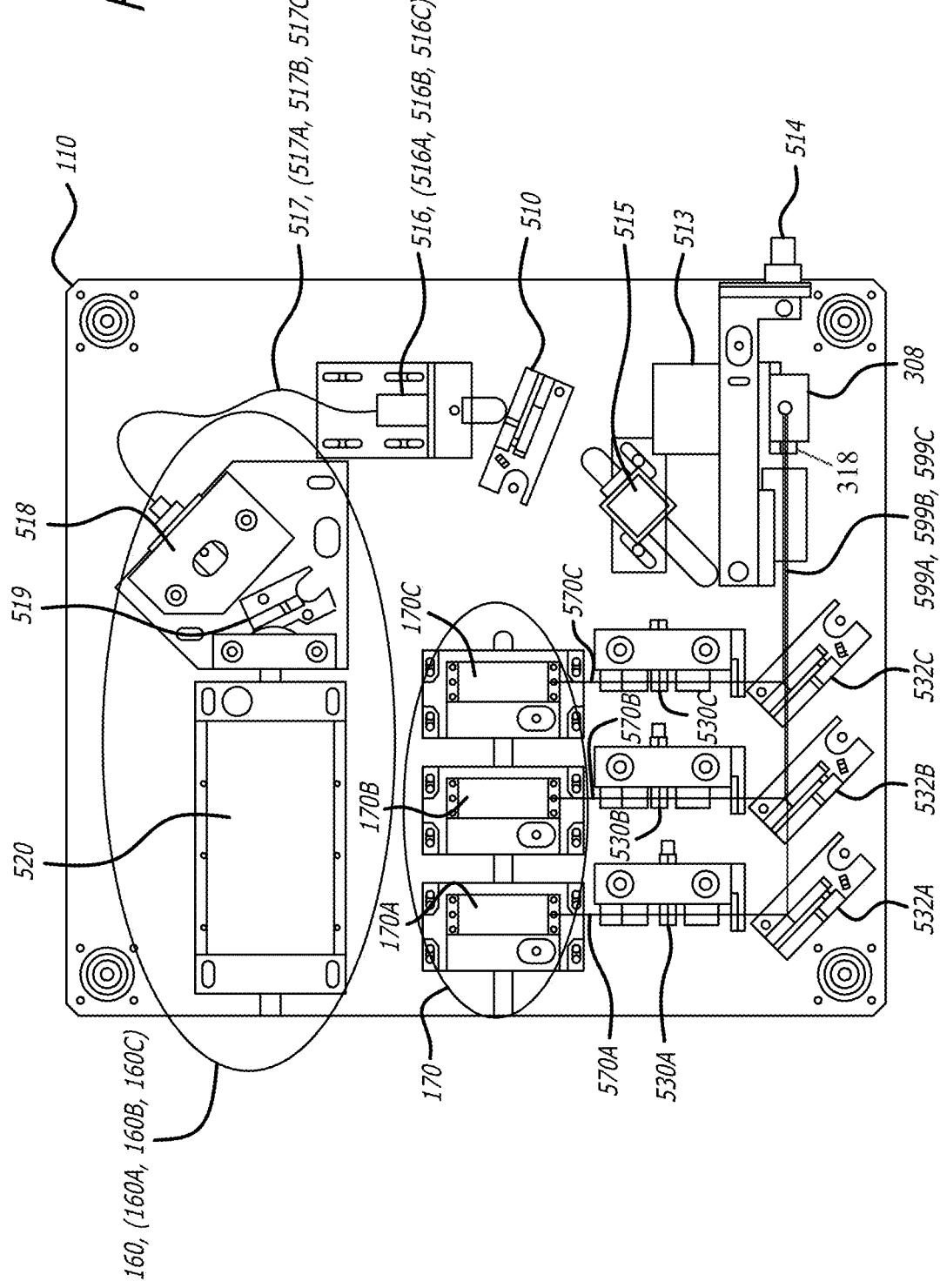
FIG. 5 shows an optical plate assembly in the top-side of the modular flow cytometry system.

FIG. 5 shows a top view of the optical plate assembly 110 in the modular flow cytometry system 100. The optical plate assembly 110 includes a laser system 170 having three semiconductor lasers 170A,170B,170C that direct excitation into the flow cell assembly 308. The laser system 170 attempts to direct the multiple (e.g., three) laser beams in a co-linear manner toward the flow cell assembly 308. However, the multiple laser beams can be slightly offset from one another. The laser system 170 includes semiconductor lasers 170A,170B,170C having wavelengths typically at about 405 nanometers (nm), 488 nm, and 640 nm. The output power of the 405 nm semiconductor laser is usually greater than 30 milliwatts (mW); the output power of the 488 nm semiconductor laser is usually greater than 20 mW; and the output power of the 640 nm semiconductor laser is usually greater than 20 mW. Controller electronics control the semiconductor lasers to operate at a constant temperature and a constant output power.

An optical system spatially manipulates the optical laser beams 570A,570B,570C generated by the semiconductor lasers 170A,170B,170C respectively. The optical system includes lenses, prisms, and steering mirrors to focus the optical laser beams through a fluidic window 318 (see FIGS. 3 and 5) onto a fluidic stream carrying biological cells (bio cells). The focused optical laser beam size is focused for 50-80 microns (μm) across the flow stream and focused for 5-20 μm along the stream flow in the flow cell assembly 308.

In FIG. 5, the optical system includes beam shapers 530A-530C that receive the laser light from the semiconductor lasers 170A-170C, respectively. The laser light output from the beam shapers 530A-530C are coupled into mirrors 532A-532C respectively to direct the laser light 599A,599B, 599C towards and into the flow cell assembly 308 to target particles (e.g. biological cells). The laser light 599A,599B, 599C is slightly separated from each other but directed substantially in parallel by the mirrors 532A-532C into the flow cell assembly 308 through the fluidic window 318.

The laser light beams 599A,599B,599C arrive at the biological cells (particles) in the flow stream in the flow cell assembly 308. The laser light beams 599A,599B,599C are then scattered by the cells in the flow stream. A forward scatter diode 514 gathers on-axis scattering light. A collection lens 513 gathers the off-axis scattering light and the fluorescent light and directs them together to a dichromatic mirror 510. The dichromatic mirror 510 focuses the off-axis scattering light onto a side scatter diode 515. The dichromatic mirror 510 focuses the fluorescent light onto at least one fiber head 516. At least one fiber assembly 517 routes the fluorescent light toward at least one grating assembly 160.

Figure 4:
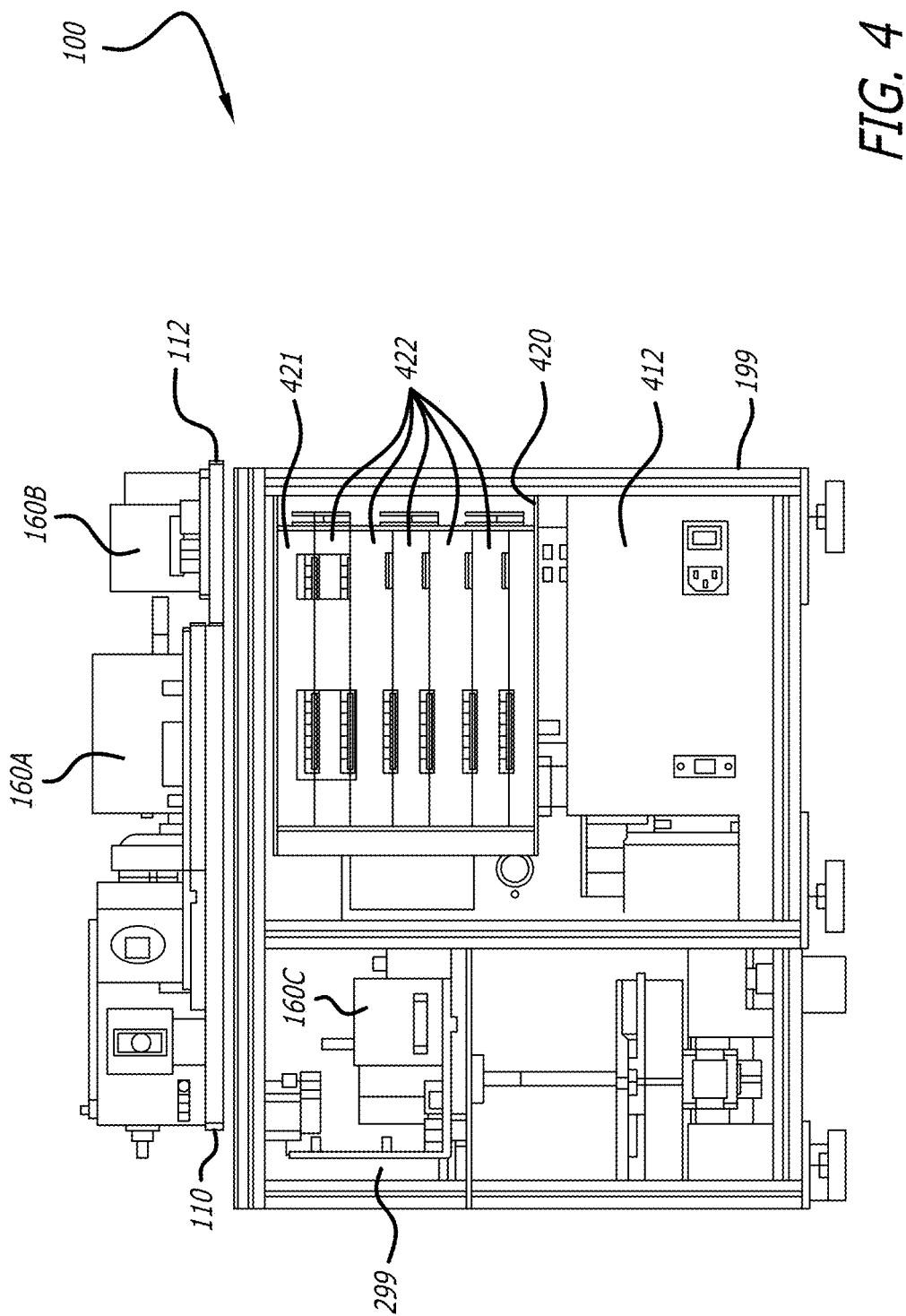
FIG. 4 shows a rear-side view or the modular flow cytometry system.

For a more detailed analysis of a biological sample using different fluorescent dyes and lasers wavelengths, multiple fiber heads 156, multiple fiber assemblies 517, and multiple grating assemblies 160 can be used. Three fiber heads 516A,516B,516C can be situated in parallel to receive the fluorescent light and the three fiber assemblies 517A,517B, 517C can be used to direct the fluorescent light to three grating assemblies 160A,160B,160C (collectively referred to as grating assemblies 160) as shown in FIG. 4.

The three fiber heads 516A,516B,516C (and three fiber assemblies 517A,517B,517C) are enabled because the three laser light beams 599A,599B,599C are slightly offset (e.g., not precisely co-linear). Accordingly, three fiber heads 516A,516B,516C can separately collect light beam data from fluoresced cells excited by the three laser light beams 599A,599B,599C, which have three different wavelengths. Advantageously, the three fiber assemblies 517A,517B, 517C can then direct the collected light into the three gratings (e.g., the grating 519 in each of the three grating assemblies 160A,160B,160C) at different locations in the modular flow cytometry system 100, such as the top side (e.g., grating assembly 160A mounted to the optical plate 110, grating assembly 160B mounted to the side plate 112) or a lower bay (e.g., grating assembly 160C mounted in the lower level/shelf 299) of the modular enclosure 199 as is shown in FIG. 4. The flexibility in locating the grating assemblies 160 in the modular flow cytometry system 100 can provide a more compact footprint and allow the system to be located on a bench top or desktop of a bench or desk, respectively.

Alternatively, the modular flow cytometry system 100 can use one grating 519 to collect the light beam data. For example, the three fiber assemblies 517A,517B,517C direct light into one grating 519, as opposed to multiple gratings (e.g., the three gratings 519 of the three grating assemblies 160A,160B,160C). Separation of the light beam data is then handled as data processing operations, instead of separating the light beam data by using three gratings. Using one grating can be less complex from a physical device standpoint. However, with one grating, the data processing operations can be more complex because separation of the light beam data requires more data manipulation (e.g., identifying different wavelengths and separating light beam data accordingly).

Cell geometric characteristics can be categorized through analysis of the forward scattering data and the side scattering data associated with the forward scattered light and side scatted light, respectively. The cells in the fluidic flow are labeled (colored) by dyes of visible wavelengths ranging from 400 nm to 900 nm. When excited by the lasers, the dyes coloring the cells produce fluorescent light, which are collected by a fiber assembly 517 and routed toward a grating assembly 160. The modular flow cytometry system 100 maintains a relatively small size for the optical plate assembly 110 via compact semiconductor lasers 170, an 11.5× power collection lens 513, and integrated photomultiplier tube (PMT)/avalanche photo-diode (APD) grating assemblies 160 (see FIG. 5). The short focal length of the 11.5× power collection lens 513 has a numerical aperture (NA) of about 1.3 facing the fluorescence emissions, and an NA of about 0.12 facing the collection fiber. This significantly reduces the depth of the instrument. Meanwhile, the grating assembly 160 replaces traditional individual PMT filters with compact, on-printed circuit board (on-PCB) array of detectors (e.g., see detector array 621 of the receiver assembly 520 shown in FIG. 6). The compact array of detectors in the grating assembly 160 eliminates the need for a space consuming cascade of mirrors and filters in, or at the end of, the collection path.

Instead, a compact collimating lens 518 at the input of the grating assembly 160 directs light emitted from the output end of the collection fiber onto a diffraction grating 519. The diameter of the core of the collection fiber of the fiber assembly 517 is between about 400 μm and 800 μm, and the fiber NA is about 0.12 mm for a core diameter of about 600 μm. The fiber output end can be tapered to a core diameter of between about 100 μm and 300 μm for controlling the imaging size onto the receiving photodiode. The input end of the collection fiber can be a lensed fiber to increase the collection NA for allowing use of a fiber core diameter that is less than about 400 μm. Because optical fiber has the flexibility to deliver the light anywhere in the system, the use of optical fiber as the collection fiber for fluorescence light collection enables optimization of the location of the receiver assembly 520 and electronics for a compact flow cytometer 100. The optical performance of the grating 519 is designed to have a flat diffraction efficiency over a wavelength range of at least 200 nm, preferably more than 400 nm in the visible wavelength range from 350 nm to 850 nm.

Alternatively, two grating assemblies 160 each with a grating to provide two gratings 519 in the modular flow cytometry system 100 can be used along with a diachronic mirror to separate the wide wavelength range fluorescence into two spectrum ranges, one spectrum range from 350 nm to 600 nm and the other spectrum range from 600 nm to 850 nm. Two gratings thereby reduce, to half, the requirement on the covered diffraction spectrum range of the gratings. An alternative dispersive element, such as a linear graded long pass filter, can be used in place of a diffraction grating for the dispersing element 519 for dispersing the fluorescent light.

Figure 6:
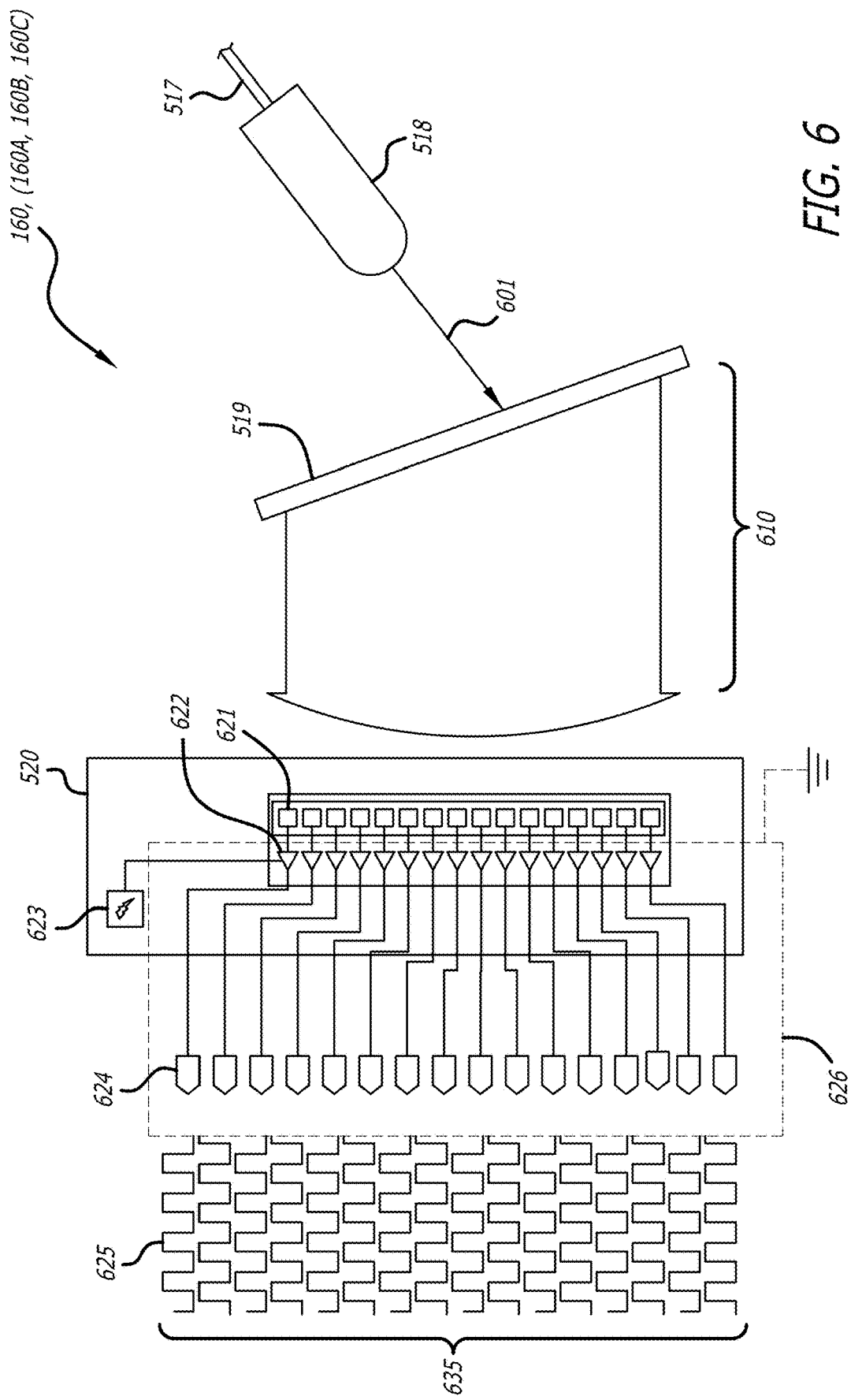
FIG. 6 is a schematic diagram of a detector array signal chain.

FIG. 6 is a schematic diagram of at least one detector array signal chain of possibly three or more that are in the modular flow cytometry system 100. The light 601 from the collimating lens 518 is coupled into the grating 519. The grating 519 disperses the light 601 into a spectrally dispersed output light 610. The spectrally dispersed output light 610 from the grating 519 is focused directly onto a PCB-mounted detector array 621. Each detector array 621 is comprised of at least two sets of channels, with each set typically being 8 channels. For example, the detector array 621 in FIG. 6 includes 16 channels formed of two sets of 8 channels. In another embodiment, the PCB-mounted detector array can include 8 channels, 9 channels, 10 channels, or some other number of channels.

Trans-impedance amplifier circuit 622, one per channel, converts input current from the detector into an output voltage signal. In each channel, the output voltage signal from the trans-impedance amplifier circuit 622 is coupled into an analog-to-digital converter (ADC) 624. The system 100 enables control of the trans-impedance bias voltage 623 into the trans-impedance amplifier circuit 622 of each channel to adjust the output voltage that is generated. The system 100 then couples each trans-impedance bias voltage 623 into each ADC 624.

The ADCs 624 sample the output voltage of the trans-impedance amplifiers 622 at a sufficiently high frequency to resolve pulses 625 produced by the particles (e.g., biological cells) passing through the laser interrogation region of the fluidics stream. The output pulses from the ADCs 624 form a plurality of output waveforms 635 over time. To preserve signal integrity and reduce noise, the system 100 uses electromagnetic emission (EMI) shielding 626 on the differential signal wires between the trans-impedance amplifier and ADC of each channel.

Referring again to FIG. 2, the modular flow cytometry system 100 includes three grating assemblies 160 each having a detector array. In a case of 8 channels per detector array and three grating assemblies, the flow cytometry system 100 has a total of 24 channels (3 grating assemblies×8 channels per array). In a case of 16 channels per array and three grating assemblies, the modular flow cytometry system has a total of 48-channels (3 grating assemblies×16 channels per array).

Referring again to FIG. 3, the modular flow cytometry system 100 includes a modular fluidics assembly 120 of fluidics elements and devices to control the flow of fluids. The modular fluidics assembly 120 can be located in the front of the modular flow cytometry system 100 near the flow cell assembly 308. Advantageously, localizing fluidics elements to a single enclosure tends to minimize tube lengths (and associated chassis accommodations, such as splash shields and tube galleries) and isolates the fluidics from moisture sensitive electronics. Bulkhead connectors 309 for liquid input/output (I/O) ports for input sheath fluid and output waste fluid are integrated into the front of the modular fluidics assembly 120, as opposed to the side or back panels of the cytometer system 100. This arrangement saves space and improves accessibility to tank lines with the modular flow cytometry system 100. The modular fluidics assembly 120 can be removed from modular flow cytometry system 100 as a module for ease of serviceability.

During the operation, the fluid system of the modular fluidics assembly 120 lines up color labeled cells (also referred to as dyed cells) in a fluidic stream, ready to be excited by the one or more laser beams into fluoresced cells. In the modular flow cytometry system 100, one laser can excite cells of more than 10 individually addressable colors. For three lasers in the modular flow cytometry system 100, more than 20 individually addressable colors can be excited, detected and analyzed, limited by the available dyes calibrated for applications using flow cytometers. With color detection by dispersive elements instead of physical hardware filters, a large number of colors can supported by the modular flow cytometry system 100. With a 3-laser system, the modular flow cytometry system 100 can accommodate more than 14 colors based on the available flow cytometer dyes on the market.

The sample injection tube (SIT) assembly 130 combines carryover reduction and z-axis functionalities. This significantly reduces the size of the loader assembly 140 by allowing loader sample input to use the sample input location as the manual port 310. The loader assembly 140 includes a plate loader 304 as is shown in FIG. 3. To reduce the width dimension of the system 100, the plate loader 340 employs an x-θ stage motor, as opposed to a more conventional x-y stage motor.

FIG. 4 shows a rear-side view or the modular flow cytometry system 100. The modular flow cytometry system 100 uses a purpose-built, expandable, data acquisition subsystem 411, as shown in FIG. 4. The data acquisition subsystem 411 includes a master board 421 and up to five slave boards 422 coupled to the master board 421. The master board 421 differs from the slave boards 422 in that the master board is populated with additional components for handling communication functions. In one embodiment, all boards 421,422 (master and slaves) are equipped with eight 16-bit channels for fluorescence detection, a first 12-bit channel for forward-scattered light (FSC) detection, and a second 12-bit channel for side-scattered light (SSC) detection. The data acquisition subsystem 411 includes a card cage 420 to receive six boards 421,422 (one master and five slaves) to provide a 48-channel embodiment of the modular flow cytometry system 100. The card cage 420 has dimensions of about 250 mm (width)×183 mm (height)×117 mm (depth).

A power supply module 412 provides power for the modular flow cytometry system 100. In one embodiment, for a 48-channel embodiment, the power supply module 412 includes three low-noise analog power supplies and one general purpose power supply. The low noise analog power supplies provide low noise power to the signal detection electronics (e.g., the ADCs 624, photodiode detector array 621 and the trans-impedance amplifiers 622 of the receiver assembly 520 in the grating assembly 160) isolated from more noisy circuits (e.g., the digital electronics and motors) in the modular flow cytometry system 100. The general purpose power supply of the power supply module 412 provides power for the data acquisition, fluidics, SIT, and loader electronics.

CONCLUSION

The embodiments of the invention are thus described. While embodiments of the invention have been particularly described, they should not be construed as limited by such embodiments, but rather construed according to the claims that follow below.

While certain exemplary embodiments have been described and shown in the accompanying drawings, it is to be understood that such embodiments are merely illustrative of and not restrictive on the broad invention, and that the embodiments of the invention not be limited to the specific constructions and arrangements shown and described, since various other modifications can occur to those ordinarily skilled in the art.

When implemented in software, the elements of the embodiments of the invention are essentially the code segments to perform the necessary tasks. The program or code segments can be stored in a processor readable medium or transmitted by a computer data signal embodied in a carrier wave over a transmission medium or communication link. The "processor readable medium" can include any medium that can store or transfer information. Examples of the processor readable medium include an electronic circuit, a semiconductor memory device, a read only memory (ROM), a flash memory, an erasable programmable read only memory (EPROM), a floppy diskette, a CD-ROM, an optical disk, a hard disk, a fiber optic medium, a radio frequency (RF) link, etc. The computer data signal can include any signal that can propagate over a transmission medium such as electronic network channels, optical fibers, air, electromagnetic, RF links, etc. The code segments can be downloaded via computer networks such as the Internet, Intranet, etc.

While this specification includes many specifics, these should not be construed as limitations on the scope of the disclosure or of what can be claimed, but rather as descriptions of features specific to particular implementations of the disclosure. Certain features that are described in this specification in the context of separate implementations can also be implemented in combination in a single implementation. Conversely, various features that are described in the context of a single implementation can also be implemented in multiple implementations, separately or in sub-combination. Moreover, although features can be described above as acting in certain combinations and even initially claimed as such, one or more features from a claimed combination can in some cases be excised from the combination, and the claimed combination can be directed to a sub-combination or variations of a sub-combination. Accordingly, the claimed invention is limited only by patented claims that follow below.

What is claimed is:

1. A flow cytometry system, comprising:
a laser system for emitting laser beams;
a flow cell assembly positioned to receive the laser beams at an interrogation region of a fluidics stream where fluoresced cells scatter the laser beams into fluorescent light;
a fiber assembly positioned to collect the fluorescent light; and
a receiver assembly positioned to receive the fluorescent light from the fiber assembly, wherein the receiver assembly includes
a photodiode detector array positioned to receive the fluorescent light, wherein the photodiode detector array includes a plurality of channels;
trans-impedance amplifier circuits configured to convert input current from the photodiode detector array into an output voltage signal for each channel of the plurality of channels in the photodiode detector array; and
analog-to-digital converters coupled to the trans-impedance amplifier circuits, wherein each trans-impedance amplifier circuit is coupled to a different analog-to-digital converter.

2. The flow cytometry system of claim 1, wherein:
the laser system, the flow cell assembly, and the receiver assembly are coupled to an optical plate assembly of the flow cytometry system.

3. The flow cytometry system of claim 1, wherein:
the analog-to-digital converters are configured to sample the trans-impedance amplifiers circuits at a sufficiently high frequency to resolve pulses produced by particles passing through the interrogation region of the fluidics stream.

4. The flow cytometry system of claim 1, wherein:
the fluidics stream includes at least thirteen (13) fluorescent colors; and
the flow cytometry system has a front facing width of 550 mm or less.

5. The flow cytometry system of claim 1, wherein the laser system includes one or more excitation lasers.

6. The flow cytometry system of claim 5, wherein the one or more excitation lasers are semiconductor lasers.

7. The flow cytometry system of claim 6, wherein:
the semiconductor lasers are side-by-side co-located; and
output beams of the semiconductor lasers are co-linearly arranged to excite cells in the fluidics stream.

8. The flow cytometry system of claim 1, further comprising:
a fluidic window in direct contact with a fluorescence collection lens.

9. The flow cytometry system of claim 8, wherein the fluorescence collection lens has a numerical aperture of larger than 1.0 facing the fluidic stream.

10. The flow cytometry system of claim 1, wherein the fiber assembly includes a fluorescence collection fiber having an input numerical aperture of at least 0.10 and an output numerical aperture of at least 0.10.

11. The flow cytometry system of claim 10, wherein the fiber input numerical aperture is adjusted through an integrated fiber lens.

12. The flow cytometry system of claim 10, wherein the fiber assembly has a core size of 800 microns or less.

13. The flow cytometry system of claim 10, wherein the fiber assembly has a core size of 600 microns or less.

14. The flow cytometer in claim 1, further comprising:
a dispersive element between the fiber assembly and the receiver assembly, wherein the dispersive element is configured to disperse fluorescence into thirteen or more wavelengths of light.

15. The flow cytometry system of claim 14, wherein the dispersive element is a grating.

16. The flow cytometry system of claim 14, wherein the dispersive element includes an optical system with two gratings.

17. The flow cytometry system of claim 14, wherein the dispersive element is a linearly varying wavelength filter.

18. The flow cytometry system of claim 1, wherein the flow cell assembly includes a forward scattering light receiver having a PIN photodiode.

19. The flow cytometry system of claim 1, wherein the flow cell assembly includes a side scattering light receiver having an avalanche photodiode (APD).

20. The flow cytometry system of claim 1, wherein the photodiode detector array comprises a plurality of avalanche photodiodes (APD).

21. The flow cytometry system of claim 20, wherein the detector array size is at least sixteen channels.

22. The flow cytometry system of claim 20, wherein the detector array size includes at least eight channels.

23. The flow cytometry system of claim 1, wherein each trans-impedance amplifier circuit includes an individually addressable avalanche photodiode (APD) bias voltage adjuster for equalizing a fluorescence light signal.

24. The flow cytometry system of claim 1, wherein each analog-to-digital converter samples data at a rate of at least 40 megabits per channel.

25. The flow cytometry system of claim 1, wherein the trans-impedance amplifier circuits and analog-to-digital converters are shielded from electromagnetic interference (EMI) by an EMI shield.

26. The flow cytometry system of claim 1, wherein the photodiode detector array comprises a plurality of photomultiplier tubes (PMT).

* * * * *